US010260580B2

(12) United States Patent
Merrill

(10) Patent No.: US 10,260,580 B2
(45) Date of Patent: Apr. 16, 2019

(54) ARTICULATING BRAKE COMPONENT MOUNTING PLATE FOR WHEEL ALIGNMENT CORRECTION

(71) Applicant: Compagnie Generale des Etablissements Michelin, Greenville, SC (US)

(72) Inventor: Zachary Alexander Merrill, Greenville, SC (US)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 0 days.

(21) Appl. No.: 15/756,317

(22) PCT Filed: Aug. 16, 2016

(86) PCT No.: PCT/US2016/047181
§ 371 (c)(1),
(2) Date: Feb. 28, 2018

(87) PCT Pub. No.: WO2017/040029
PCT Pub. Date: Mar. 9, 2017

(65) Prior Publication Data
US 2018/0245646 A1  Aug. 30, 2018

(51) Int. Cl.
*F16D 65/095* (2006.01)
*F16D 55/00* (2006.01)
(Continued)

(52) U.S. Cl.
CPC ........... *F16D 65/095* (2013.01); *B60B 35/04* (2013.01); *B60G 9/00* (2013.01); *F16D 51/20* (2013.01);
(Continued)

(58) Field of Classification Search
CPC .. F16D 65/095; F16D 65/0056; F16D 65/091; F16D 55/225; F16D 51/20; F16D 2051/003; B60B 35/04
See application file for complete search history.

(56) References Cited

U.S. PATENT DOCUMENTS

| 4,452,347 A | * | 6/1984 | Dozier | F16D 51/22 188/18 R |
| 4,673,064 A | * | 6/1987 | Will | B60T 1/065 188/18 A |
| 5,197,786 A | * | 3/1993 | Eschenburg | B60B 37/00 180/258 |
| 6,230,849 B1 | | 5/2001 | Lumpkin | |
| 7,021,431 B2 | * | 4/2006 | Beattie | F16D 65/092 188/73.1 |

(Continued)

FOREIGN PATENT DOCUMENTS

JP  2010208441 A  9/2010

OTHER PUBLICATIONS

European Patent Office; International Search Report and Written Opinion for patent application PCT/US2015/047723; dated Apr. 26, 2016; Publisher: European Patent Office, Rijswijk, Netherlands, pp. 1-8 enclosed.
European Patent Office; International Search Report and Written Opinion for patent application PCT/US2016/047181; dated Oct. 14, 2016; Publisher: European Patent Office, Rijswijk, Netherlands, pp. 1-9 enclosed.
(Continued)

*Primary Examiner* — Vishal R Sahni
(74) *Attorney, Agent, or Firm* — Neal P. Pierotti

(57) ABSTRACT

An apparatus for a vehicle is provided that includes and axle and an articulating brake component mounting plate carried by the axle. The articulating brake component mounting plate has an inner portion and an outer portion, and the position of the outer portion is adjustable with respect to the
(Continued)

inner portion. Either the inner portion or the outer portion defines an adjustment nut aperture. An adjustment nut is located in the adjustment nut aperture.

18 Claims, 7 Drawing Sheets

(51) Int. Cl.
*B60G 9/00* (2006.01)
*B60B 35/04* (2006.01)
*F16D 51/20* (2006.01)
*F16D 55/225* (2006.01)
*F16D 65/00* (2006.01)
*F16D 65/09* (2006.01)
*F16D 51/00* (2006.01)

(52) U.S. Cl.
CPC ............ *F16D 55/00* (2013.01); *F16D 55/225* (2013.01); *F16D 65/0056* (2013.01); *F16D 65/091* (2013.01); *B60G 2200/46* (2013.01); *B60G 2200/462* (2013.01); *B60G 2200/4622* (2013.01); *B60G 2204/61* (2013.01); *F16D 2051/003* (2013.01); *F16D 2055/0008* (2013.01); *F16D 2055/0012* (2013.01)

(56) References Cited

U.S. PATENT DOCUMENTS

2004/0074713 A1* 4/2004 Beattie .................. F16D 65/092
                                                                188/73.46
2013/0098697 A1* 4/2013 Power .................... B60B 35/04
                                                                180/14.1
2017/0341478 A1* 11/2017 Merrill .................. B62D 17/00

\* cited by examiner

ARTICULATING BRAKE COMPONENT MOUNTING PLATE FOR WHEEL ALIGNMENT CORRECTION

CROSS-REFERENCE TO RELATED APPLICATION

The present application is a national stage entry of International Application Number PCT/US2016/047181 having an international filing date of Aug. 16, 2016 and which claims priority to International Application Number PCT/US2015/047723 which has an international filing date of Aug. 31, 2015. International Application Numbers PCT/US2016/047181 and PCT/US2015/047723 are incorporated by reference herein in their entireties for all purposes.

FIELD OF THE INVENTION

The subject matter of the present invention relates to an articulating brake component mounting plate that can be used to orient brake shoes or calipers with respect to a brake drum or rotor.

BACKGROUND OF THE INVENTION

The alignment of a vehicle's wheel plane relative to the path traveled by the vehicle affects not only the handling of the vehicle but also affects the wear on the tires. As used here, alignment refers to camber, toe, and thrust. Camber is the angle between the vertical axis of the wheel and the vertical axis of the vehicle. Positive camber refers to an angle where the top of the wheel is farther away from the center of vehicle than the bottom of the wheel. Negative camber refers to an angle where the bottom of the wheel is farther away from center of the vehicle than the top. Generally speaking, camber changes of even a fourth of one degree can impact tire wear. Abnormal tire wear has been observed in certain applications with even smaller camber angles changes. Toe is the angle each wheel makes with the longitudinal axis of the vehicle. Positive toe, also referred to as toe in, is a condition where the front of the wheel is pointing in or towards the center line of the vehicle. Negative toe, also referred to as toe out, is a condition where the front of the wheel points out or away from the center line of the vehicle. Thrust is the resulting direction of travel of an axle as opposed to the direction that might be expected from the orientation of the tires on the axle. Generally speaking, toe changes of even one-tenth of a degree can have an impact on tire wear.

The typical trailer axle is made by welding a pair of spindle forgings onto a piece of axle tubing then machining the precision surfaces of both spindles simultaneously in a lathe process. The resulting axle is near perfectly straight; i.e., each spindle axis possesses zero camber and zero toe. When a typical axle is installed under a vehicle (used herein to refer to both motorized vehicles as well as trailers) and placed into normal operation under typical loading conditions, the camber does not remain at zero. The axle under load, although quite rigid, does flex. The flexing of the axle occurs because the suspension is attached to the axle at load transfer points which are significantly inboard of the ends of the axle, but the tires support the weight of the vehicle by means of attachment points which are relatively near the outboard ends of the axle. As a result of this geometry, the weight of the vehicle imposes a bending moment on the axle which in turn causes upward deflection of the ends of the axle resulting in the tires presenting a slight negative camber. As the load increases, the more negative the camber becomes. At the typical maximum legal tandem axle load in the US, it would not be unusual for the wheel camber angle to reach approximately 0.5 degrees. The contribution of tire alignment to tire wear can be particularly problematic with vehicles used for transporting heavy loads.

Once the weight is removed, the axle may recover and again affect the alignment of the wheels. Because of factors such as the additional costs and amount of material that would be required, increasing the stiffness of the axle to resolve camber issues may not be practical.

Even with the same amount of camber on each axle spindle, axle camber affects the tires differently depending on their individual wheel end position on the vehicle because most road surfaces are not flat transversely across the road. The road surface is either crowned or sloped (by about 1.5% on average) so that water will evacuate from the road surface. Trucks, in most of the world, generally operate in the right most lane, and the right most lane is usually sloped very slightly to the right. This means that all the while the vehicle is traveling on the road way, there is a gravitational pull on the rig that is pulling the vehicle to the right. This pull is resisted through the tire contact patch and the tire transmits this force to the axle by transmitting the required force opposite of the direction of pull through its interface with its wheel. The result is that as the tire rolls down the highway, the contact patch shifts leftward with respect to the wheel center. At full load and at normal pressure on a typical NGWBS tire, this shift has an effect on tire shoulder wear that is roughly the equivalent of a 0.5 degree shift in wheel camber. This means that, although the left and the right wheel may each measure approximately −0.5 degree of camber, when the shift effect is considered, the effective camber angle on the left side tires is approximately −0.7 degree, and the effective camber angle on the right side tires is approximately −0.3 degree. As a consequence of this phenomenon, the LH tires usually experience worse inboard shoulder wear than the RH tires.

When a typical tandem axle vehicle (tractor or trailer) turns, the dynamics of the vehicle favor lateral grip by the forward axle tires. As a result the pivot point of the vehicle shifts toward the forward axle tires and the rear axle tires will tend to have greater slip laterally as the vehicle negotiates a turn maneuver. For this reason, the rear tires on a tandem axle pair receive more scrub and have a faster wear rate than the tires on the forward axle. Scrub tends to arrest the development of irregular wear and thus the rear tires usually are less affected by the camber issue than are the tires on the forward axle.

So as a consequence, the tire irregular wear issue is usually worst on the inboard surface of the LF tire. Next worst is the LR tire. The RF tire comes next but is sometimes similar in severity to the LR. The most even wear usually is found on the RR tire depending upon the particular application, load, and routes normally traveled. It should be obvious that in countries such as Australia, where drivers drive on the left side of the road instead of the right side, the above would be reversed.

One mechanism of adjusting axial alignment involves a system that includes a spindle sleeve that has an outer surface about a first axis of revolution and an inner surface about a second axis of revolution at an angle to the first axis. The predetermined angle may be in a vertical direction to induce a change in camber, in a horizontal direction to induce a change in toe, or a combination thereof. The wheel can thus be set at an angle to the spindle, but doing so requires a means by which the contact surface orientation of the brake friction material can be properly matched to the friction surface of the brake disc or drum. Since the brake shoe or the brake caliper brackets are non-adjustable and rigidly attached to the axle tubing there is no way to adjust the alignment of the brake friction material to the brake contact material after the angular adjustment is made to the wheel. As such, a need exists for providing easy adjustability to the brakes so that the brake friction material can be properly aligned with the corresponding friction surface of the brake drum or brake disc.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
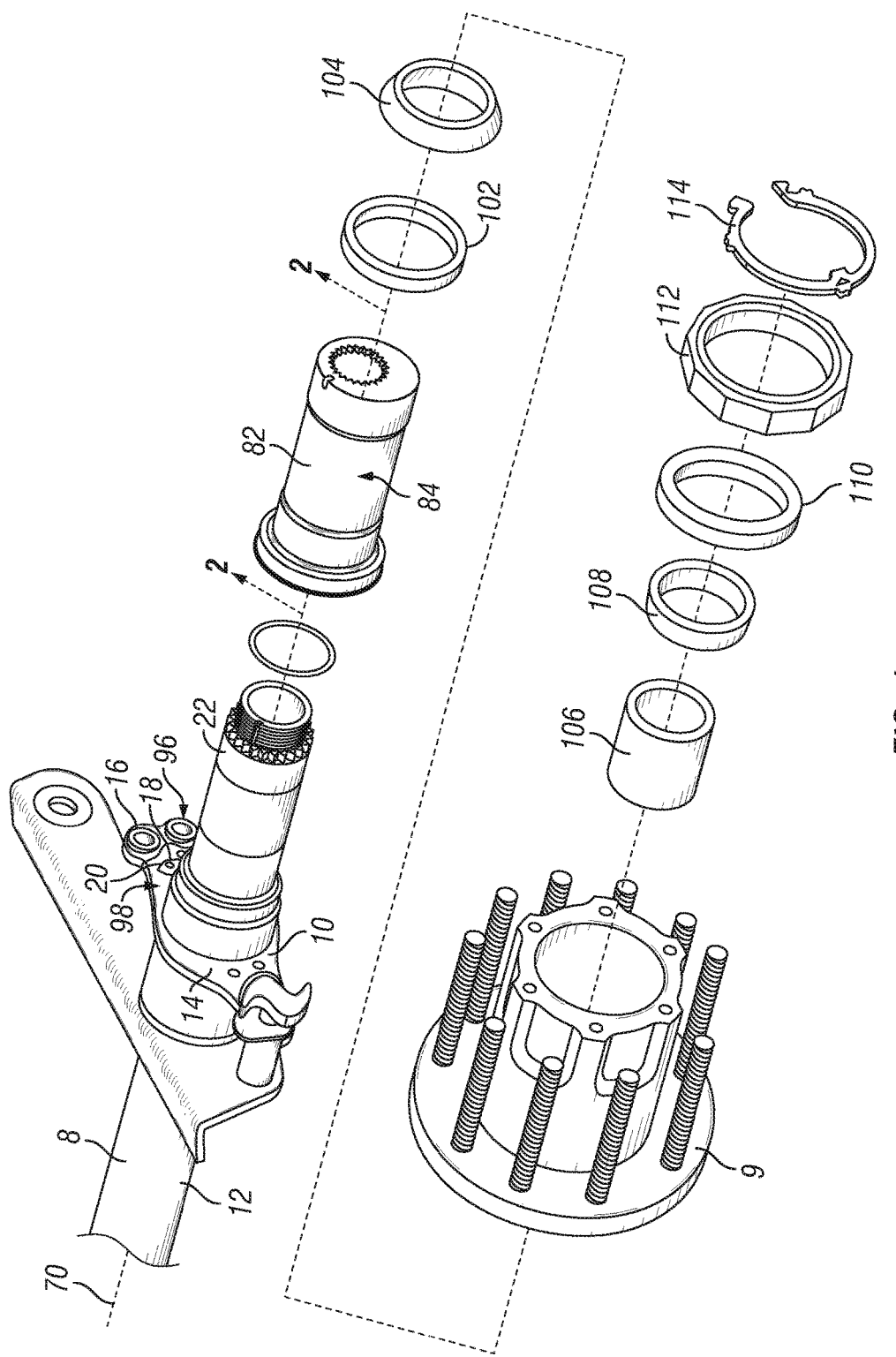
FIG. 1 is an exploded perspective view of the rear outboard side of the assembly of axle, spindle, spindle sleeve, articulating brake component mounting plate, spindle sleeve washer and spindle nut.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The following terms are defined as follows for this disclosure:

"Axial direction" or the letter "A" in the figures refers to a direction parallel to the axis of rotation of for example, the hub or the wheel as it travels along a road surface.

"Radial direction" or the letter "R" in the figures refers to a direction that is orthogonal to the axial direction and extends in the same direction as any radius that extends orthogonally from the axial direction.

"Toe" means the angle of the equatorial plane of the tire with respect to the longitudinal axis of the vehicle.

"Camber" means the angle of the equatorial plane of the tire with respect to the vertical axis of the vehicle.

"Vehicle" includes motorized vehicles and non-motorized vehicles including trailers.

FIG. 1 provides an embodiment of an apparatus for adjusting the alignment of the axis of rotation of a hub 9 relative to a spindle 22 attached at the end of an axle 12. The hub 9 is retained on the axle 12 usually by way of an axle nut, also referred to as a spindle nut 112, which engages a threaded end of the spindle 22. In this particular embodiment, the spindle 22 and hub 9 are typical to what may be observed on a heavy vehicle such as a truck trailer, but it should be understood that the invention disclosed could be used with other vehicle types.

Figure 2:
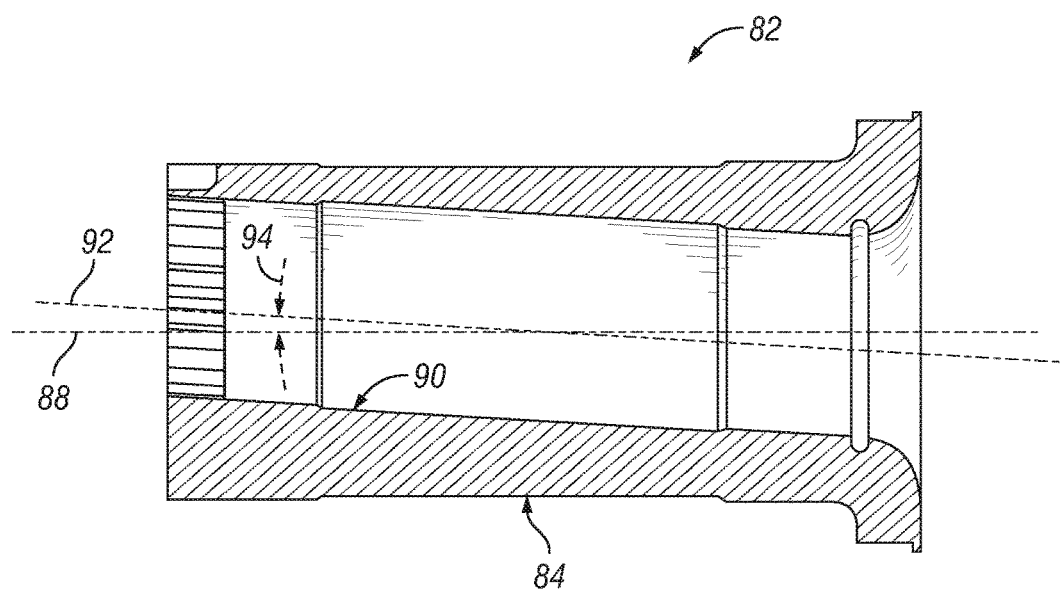
FIG. 2 is a cross-sectional view of the spindle sleeve taken along line 2-2 in FIG. 1.

The axle 12 may have an axle tube 8. The spindle 22 has an outer surface of revolution centered upon an axis 70 of the axle 12. The spindle 22 can be mounted to the axle tube 8 or any other portion of the axle 12 in a variety of manners in accordance with various exemplary embodiments. A spindle sleeve 82, shown in cross-section in FIG. 2, possessing a spindle sleeve inner surface 90 is machined to a diameter so as to fit over the outer surface of the spindle 22. The spindle sleeve inner surface 90 is a generally cylindrical surface of revolution about a spindle sleeve inner surface axis 92. When the spindle sleeve 82 is mated with the spindle 22, the spindle axis which is the same as the axis 70 of the axle 12 and the spindle sleeve inner surface axis 92 are positionally and angularly aligned to one another such that the axes 70, 92 are geometrically the same and are coaxial.

The spindle sleeve 82 possesses a spindle sleeve outer surface 84 with an outer surface of revolution about a spindle sleeve outer surface axis 88 which is oriented at a predetermined angle and position relative to the spindle sleeve inner surface axis 92. In this regard, the spindle sleeve outer surface axis 88 and the spindle sleeve inner surface axis 92 are oriented at an angle 94 to one another. This predetermined angle 94 may be in a vertical direction (inducing a positive or negative change in camber) or horizontal direction (inducing a positive or negative change in toe) or a combination thereof (inducing a positive or negative change in camber and inducing a positive or negative change in toe). It should be appreciated that the value of the difference in angle between the spindle sleeve outer surface axis 88 and the spindle sleeve inner surface axis 92 may be nonzero when viewed in a particular direction. For example the difference in angle may be zero in the horizontal where no change in toe is occurring while having a positive or negative change in angle in the vertical direction where a change in camber is occurring. The angle between the spindle sleeve inner surface axis 92 and the spindle sleeve outer surface axis 88 is chosen depending upon the desired adjustment of the camber, toe and thrust angle of the hub 9 (and attached wheel).

The vertical and horizontal placement and the angular alignment of the spindle sleeve outer surface axis 88 relative to the spindle sleeve inner surface axis 92 is limited to the thickness of the spindle sleeve 82 walls. The walls must be sufficiently thick so as not to deform during handling of the spindle sleeve 82, installation of the spindle sleeve 82 upon the spindle 22, or operation of the vehicle as the loads are transmitted from the vehicle through the spindle 22, spindle sleeve 82, wheel bearings, hub 9 and to the road surface.

With reference back to FIG. 1, the hub 9 is rotationally mounted onto the exterior surface of the spindle sleeve 82. This rotational mounting may be accomplished by the use of one or more bearings between the hub 9 and the spindle sleeve 82 in the radial direction. The bearing arrangement can include inner races 104 and 108 on the spindle sleeve outer surface 84 and spaced from one another a distance in the axial direction of the spindle sleeve inner surface axis 92 by a bearing spacer 106. A washer 110 can be located outboard of and can engage the inner race 108. A seal 102 may be pressed on the inboard portion of the spindle sleeve 82 and inboard portion of the hub 9. The seal 102 illustrated is a unitized type seal, but other seal types are possible such as non-unitized positive contact lip seals. Other components can be included in the bearing arrangement, and the hub 9 can be placed into rotating engagement with the spindle sleeve 82 in a variety of manners in accordance with other exemplary embodiments.

The spindle 22 may be welded to an end of an axle tube 8 and when the suspension system is unloaded, the axes of the spindles 22 on each side are aligned and have zero degrees of camber and zero degrees of toe. As discussed above, the vehicle dynamics and loads placed upon the axle 12 by the vehicle weight and cargo deflect the axle 12 causing the spindles 22 to take on a small amount of camber. The spindle sleeve 82 allows adjustment of the wheel camber, toe and thrust angles by a desired amount.

A keyway may be positioned on the rear end of the axle 12 and may extend into a spindle wall portion and may extend in length in the direction of the axis 70. The keyway allows a spindle nut lock ring 114 to prevent the spindle nut 112 from rotating relative to the spindle 22.

The spindle nut 112 shown here is a locking spindle nut having a spindle nut lock ring 114. Such axle spindle nuts are available commercially under the brand name "PRO-TORQ®" by STEMCO. Other spindle nuts 112 may be used, including a castle nut, a nut and retaining washer, or dual nut and a lock plate. It should also be understood that such spindle nuts may work in conjunction with a cotter pin inserted through an aperture on the spindle 22 instead of a keyway as described.

When the angle of the camber and toe is changed, the angle that the brake components attached to the axle 12, such as the brake shoes 62, change with respect to the brake components attached to the hub 9, such as the brake drum 66. The brake components attached to the axle 12 should be attached in a manner to accommodate the change in angle. To accommodate the change of position of the brake components, an articulating brake component mounting plate 10 can be used to attach the brake components to the axle 12. In this embodiment, the articulating brake component mounting plate 10 takes the form of a spider plate 10 which possesses an outer portion 16 which pivots relative to an inner portion 14. The spider plate outer portion 16 is attached to the inner portion 14 by an engagement pin 28 that can be a bolt, stud, threaded member, or any other component capable of effecting attachment to the outer portion 16 and inner portion 14. One end of each brake shoe 62 attaches to the outer portion 16.

Figure 3:
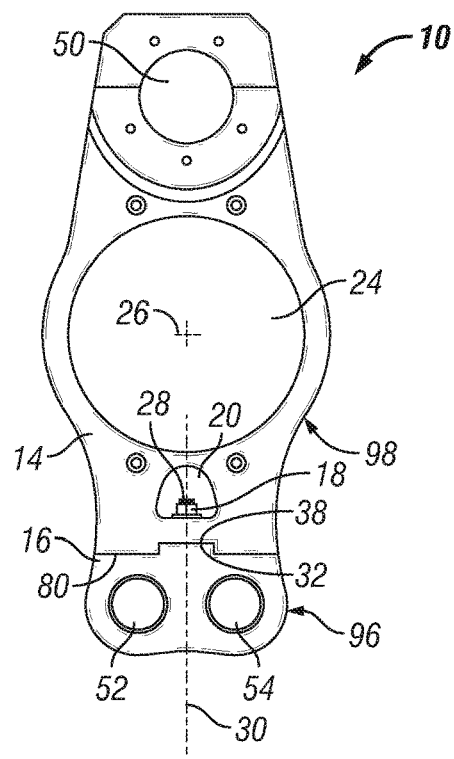
FIG. 3 is a front plan view of an articulating brake component mounting plate in accordance with one exemplary embodiment.
Figure 5:
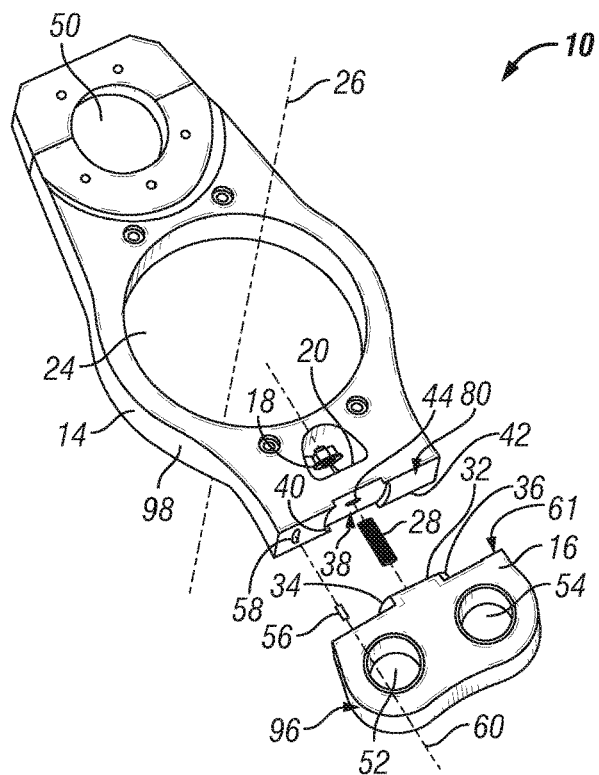
FIG. 5 is an exploded perspective view of the articulating brake component mounting plate.

The articulating brake component mounting plate 10 is shown in a plan view in FIG. 3. The spindle aperture 24, having a spindle aperture axis 26, extends completely through the articulating brake component mounting plate 10 and has a circular shape. A cam aperture 50 likewise extends completely through the articulating brake component mounting plate 10. The outer portion 16 has a first brake pin aperture 52 and a second brake pin aperture 54 that have axes that are parallel to the spindle aperture axis 26 and the cam aperture 50. Referring now both to FIGS. 3 and 5, the engagement pin 28 is rigidly attached to the outer portion 16 such that the position of the engagement pin 28 relative to the outer portion 16 does not change. The engagement pin 28 is threaded and the adjustment nut 18 is received onto the threading of the engagement pin 28. Tightening of the adjustment nut 18 causes the outer portion 16 and the inner portion 14 to be drawn together and their positions relative to one another to be held in place.

The adjustment nut 28 is located within an adjustment nut aperture 20 of the inner portion 14. The adjustment nut aperture 20 extends completely through the inner portion 14 and may have an acorn like shape. The adjustment nut aperture 20 may be large enough to accommodate a wrench inserted therein for tightening and loosening of the adjustment nut 18. It is to be understood, however, that the arrangement of the components can be reversed in other exemplary embodiments so that the adjustment nut aperture 20 and the adjustment nut 18 are located at the outer portion 16, and the engagement pin 28 is rigidly attached to the inner portion 14 instead of to the outer portion 16. The adjustment nut 18 may be located inside of the inner portion 14 or the outer portion 16 such that material of the inner portion 14 or outer portion 16 circles the adjustment nut 18 three hundred and sixty degrees. The adjustment nut 18 may not be located on an exterior outer surface of the inner portion 14 or outer portion 16 but instead may be located on an interior surface of one of these portions 14 or 16. The adjustment nut 18 can be any type of nut such as a 12 point nut with a flange. The adjustment nut 18 may be a compact high strength nut configuration which help facilitate accessibility and utility.

Figure 4:
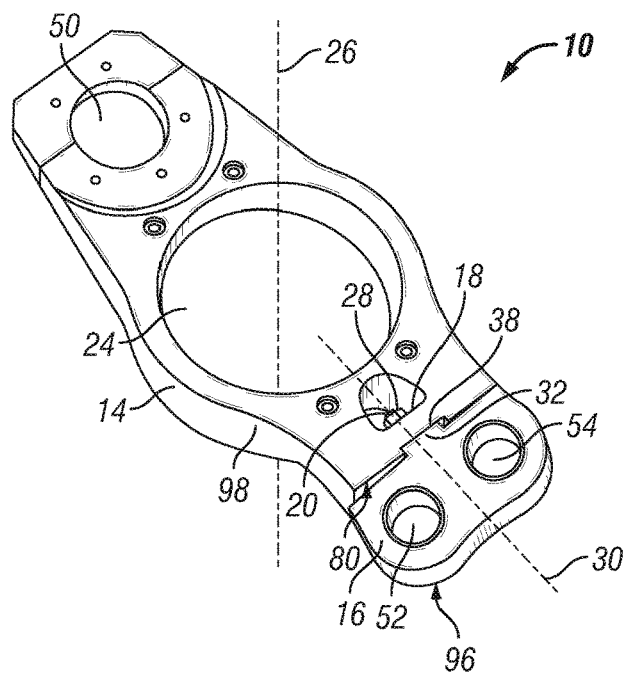
FIG. 4 is a perspective view of the articulating brake component mounting plate of FIG. 3 with the outer portion adjusted at an angle to the inner portion.

The angular positioning of the outer portion 16 to the inner portion 14 is zero degrees in FIG. 3 so that these components 14, 16 are aligned to one another. In FIG. 4, the adjustment nut 18 has been loosened to allow the outer portion 16 to rotate some amount about the engagement pin 28 relative to the inner portion 14. Once a desired amount of rotation is realized, the adjustment nut 18 can be tightened to fix the positioning of the outer portion 16 relative to the inner portion 14. Rotation of the outer portion 16 causes the bottom surface 80 of the inner portion 14 to be exposed. The bottom surface 80 is an exterior surface of the inner portion 14 and directly faces the outer portion 16. Rotation of the outer portion 16 causes the axes of the first and second brake pin apertures 52, 54 to no longer be coaxial with the axis of the cam aperture 50 and the spindle aperture axis 26.

With reference back to FIG. 3, the adjustment nut aperture 20 is spaced from the bottom surface 80 of the inner portion 14 so that material making up the inner portion 14 is located between the bottom surface 80 and the adjustment nut aperture 20. No portion of the bottom surface 80 is defined or made up by the adjustment nut aperture 20. In other embodiments, the adjustment nut aperture 20 need not be a closed aperture in that it may open onto the inner portion exterior surface 98. Although shown as extending completely through the inner portion 14, the adjustment nut aperture 20 in some embodiments may only extend into some amount of the thickness of the inner portion 14.

Figure 6:
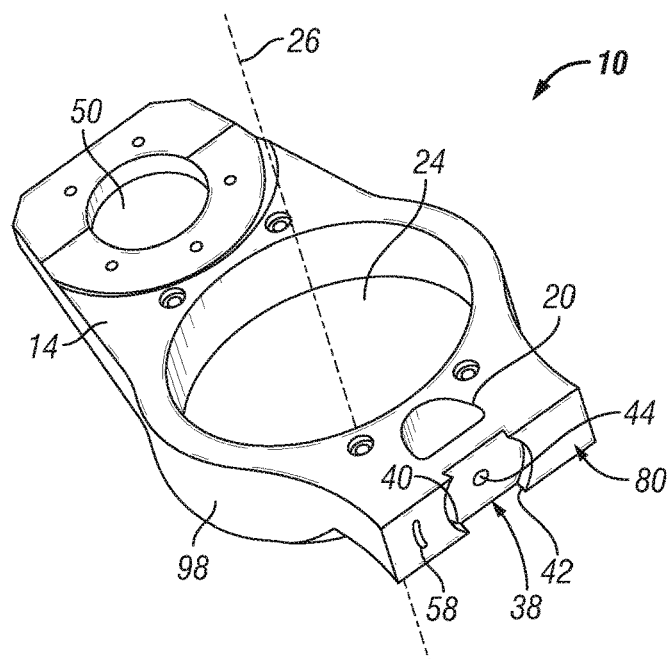
FIG. 6 is a perspective view of the inner portion of the articulating brake component mounting plate.

FIG. 6 shows a perspective end view of the inner portion 14 in which the bottom surface 80 includes a receiving recess 38. The receiving recess 38 has a first curved surface 40 and a second curved surface 42 that are both concave in shape and that directly oppose and face one another. An engagement pin aperture 44 extends through the bottom surface 80 and to the adjustment nut aperture 20, and the engagement pin 28 is disposed into the engagement pin aperture 44 when the articulating brake component mounting plate 10 is assembled. The first curved surface 40 and the second curved surface 42 do not engage one another in that upper and lower side edges of the inner portion 14 separate these surface 40, 42. In other embodiments, the first and second curved surfaces 40 and 42 do in fact engage one another and a resulting circular receiving recess 38 can be established.

A limiting pin groove 58 is also defined in the bottom surface 80 and is located between the receiving recess 38 and the inner portion exterior surface 98. The limiting pin groove 58 is arcuate in shape such that its smaller curved edge is closer to the receiving recess 38 than its longer curved edge. The limiting pin groove 58 extends some arc length distance and is closed in that it does not form any portion of the upper or lower surfaces of the inner portion 14 or the inner portion exterior surface 98. The limiting pin groove 58 does not extend all the way through the inner portion 14 to the spindle aperture 24, but stops some amount short thereof.

Figure 7:
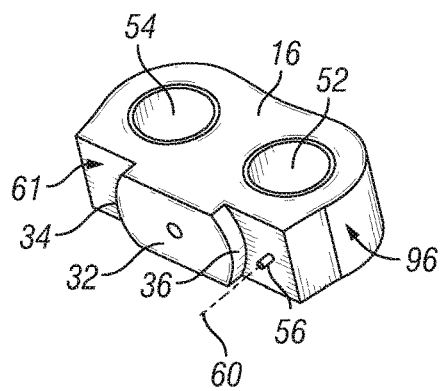
FIG. 7 is a perspective view of the outer portion of the articulating brake component mounting plate.
Figure 8:
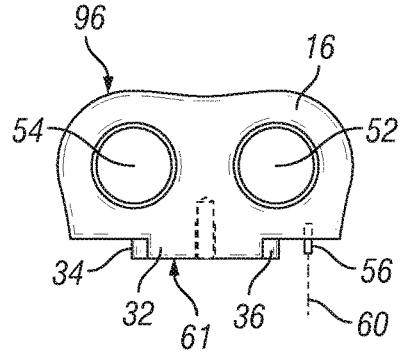
FIG. 8 is a front plan view of the articulating brake component mounting plate of FIG. 7.
Figure 9:
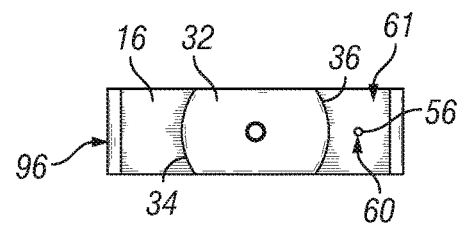
FIG. 9 is a bottom plan view of the articulating brake component mounting plate of FIG. 7.

FIGS. 7-9 illustrate the outer portion 16. The limiting pin 56 extends from a top surface 61 of the outer portion 16. The limiting pin 56 has a limiting pin axis 60 that is parallel to the axis of the engagement pin 28. The top surface 61 has an outer portion protrusion 32 that has a first curved surface 34 and a second curved surface 36 on opposite ends. The curved surfaces 34, 36 are convex in shape and are spaced from one another in that upper and lower edges of the outer portion 16 are located between them. In other arrangements the curved surfaces 34, 36 can touch one another so that the outer portion protrusion 32 is circular in shape.

When the outer portion 16 is assembled to the inner portion 14, the limiting pin 56 is disposed within the limiting pin groove 58. Rotation of the outer portion 16 about the engagement pin axis 30 causes the limiting pin 56 to move within the limiting pin groove 58. The arc shape of the limiting pin groove 58 allows the limiting pin 56 to move in an arc as the outer portion 16 is rotated. At some point of rotation the limiting pin 56 will engage the end of the limiting pin groove 58 and thus will contact the inner portion 14 and will be prevented from further rotation. The outer portion 16 thus cannot rotate any more relative to the inner portion 14. Reversal of the rotation will likewise cause the limiting pin 56 to contact the inner portion 14 on the opposite side of the limiting pin groove 58 to limit rotation in the opposite direction. As such, the limiting pin 56 limits the amount of rotation of the outer portion 16 relative to the inner portion 14. The amount of allowable rotation may be from 0-5 degrees, from 5-10 degrees, from 10-15 degrees, from 15-25 degrees, or up to 45 degrees in accordance with various exemplary embodiments.

During rotation, the first curved surface 34 directly faces and may engage the first curved surface 40, and the second curved surface 36 may directly face and engage the second curved surface 42. The complimentary shapes of the surfaces 34, 36, 40 and 42 allow the outer portion protrusion 32 to rotate relative to the receiving recess 38 and prevent lateral movement between the inner and outer portions 14, 16.

Figure 10:
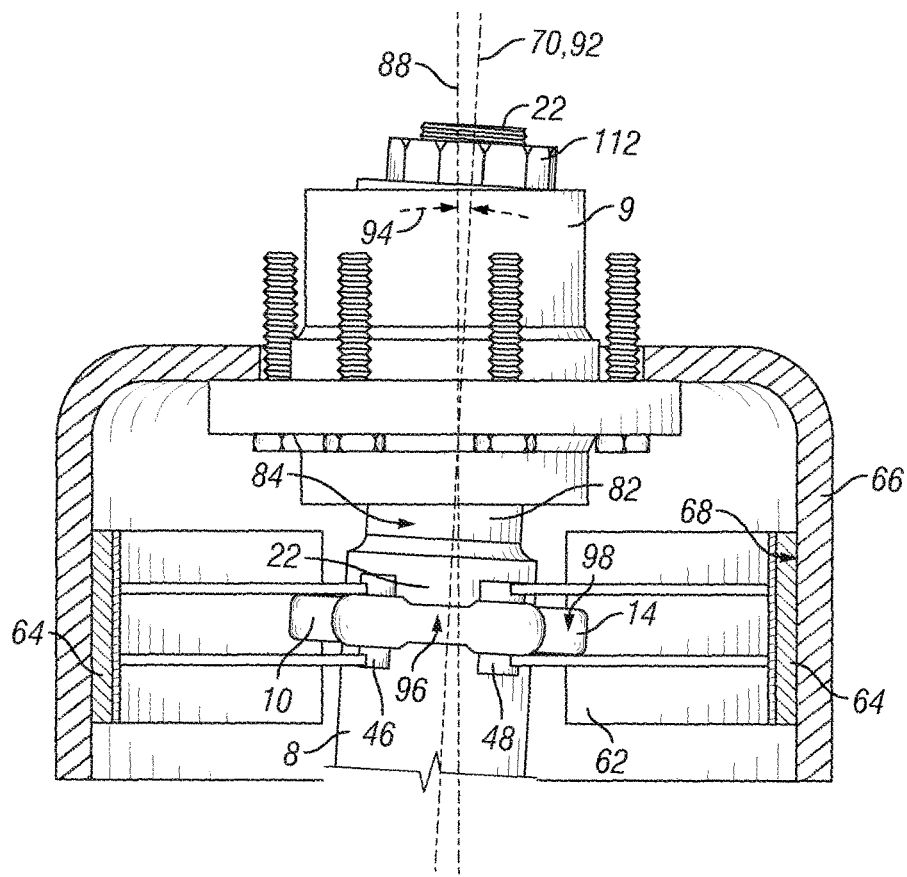
FIG. 10 is a side view of the axle assembly with a portion of the brake drum and brake pads removed for clarity.

FIG. 10 shows a partial cross-sectional view of the wheel assembly in which a brake drum 66 is mounted onto the hub 9. Rotation of the hub 9 about the spindle sleeve outer surface axis 88 likewise causes the brake drum 66 to rotate about the spindle sleeve outer surface axis 88. The hub 9 is rotationally mounted to the spindle sleeve outer surface 84 which will likewise rotate about the spindle sleeve outer surface axis 88 when the hub 9 is rotated. The axle tube 8 lies along the axis 70 as does the spindle sleeve inner surface 90 which lies along the spindle sleeve inner surface axis 92. The articulating brake component mounting plate 10 is rigidly mounted onto the spindle 22 which may in turn be part of or rigidly mounted to the axle tube 8. However, it is to be understood that the axle 12, axle tube 8, and spindle 22 may be considered to be one component or portions of one component in accordance with different exemplary embodiments.

The spindle aperture 24 may be located onto the spindle 22 and the articulating brake component mounting plate 10 can be attached to the spindle 22 through welding or some other connection so that the inner portion 14 does not move relative to the spindle 22. The spindle aperture axis 26 can be coaxial with the axis 70 and the spindle sleeve inner surface axis 92. The outer portion 16 is rigidly attached to the brake shoes 62 via the first brake pin 46 and the second brake pin 48. The outer portion 16 is rotated relative to the inner portion 14 so that the alignment between the brake shoes 62 and the brake drum 66 is correctly made to ensure the brake drum inner surface 68 directly faces and is not angled relative to the brake shoe frictional pads 64 located on the ends of the brake shoes 62.

Figure 11:
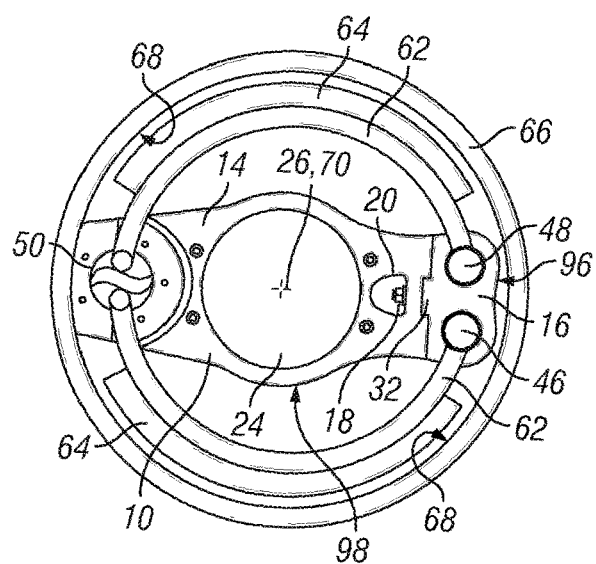
FIG. 11 is an end view of the wheel end and brake components.

FIG. 11 shows an end view of the wheel end and brake components. The angular adjustment of the outer portion 16 and the inner portion 14 can be made while the components are assembled without the need to disassemble portions of the wheel end and the brake components. The location of the adjustment nut aperture 20 with the adjustment nut 18 allows for such adjustment because the adjustment nut 18 can be accessed in the disclosed location on the face of the inner portion 14, or the face of the outer portion 16 in other embodiments, as opposed to other portions of the articulating brake component mounting plate 10 such as the outer portion exterior surface 96 on the right end of the outer portion 16.

After assembly of the wheel and brake components, the adjustment nut 18 can be loosened and the brakes can be applied. This action may cause the brake shoe frictional pads 64 to align with the brake drum inner surface 68 so that these two components 64, 68 directly face one another and are in alignment with one another. The adjustment nut 18 can then be tightened and the brakes can be released. In this sequence, the brake shoe frictional pads 64 are properly aligned with the brake drum inner surface 68.

Figure 12:
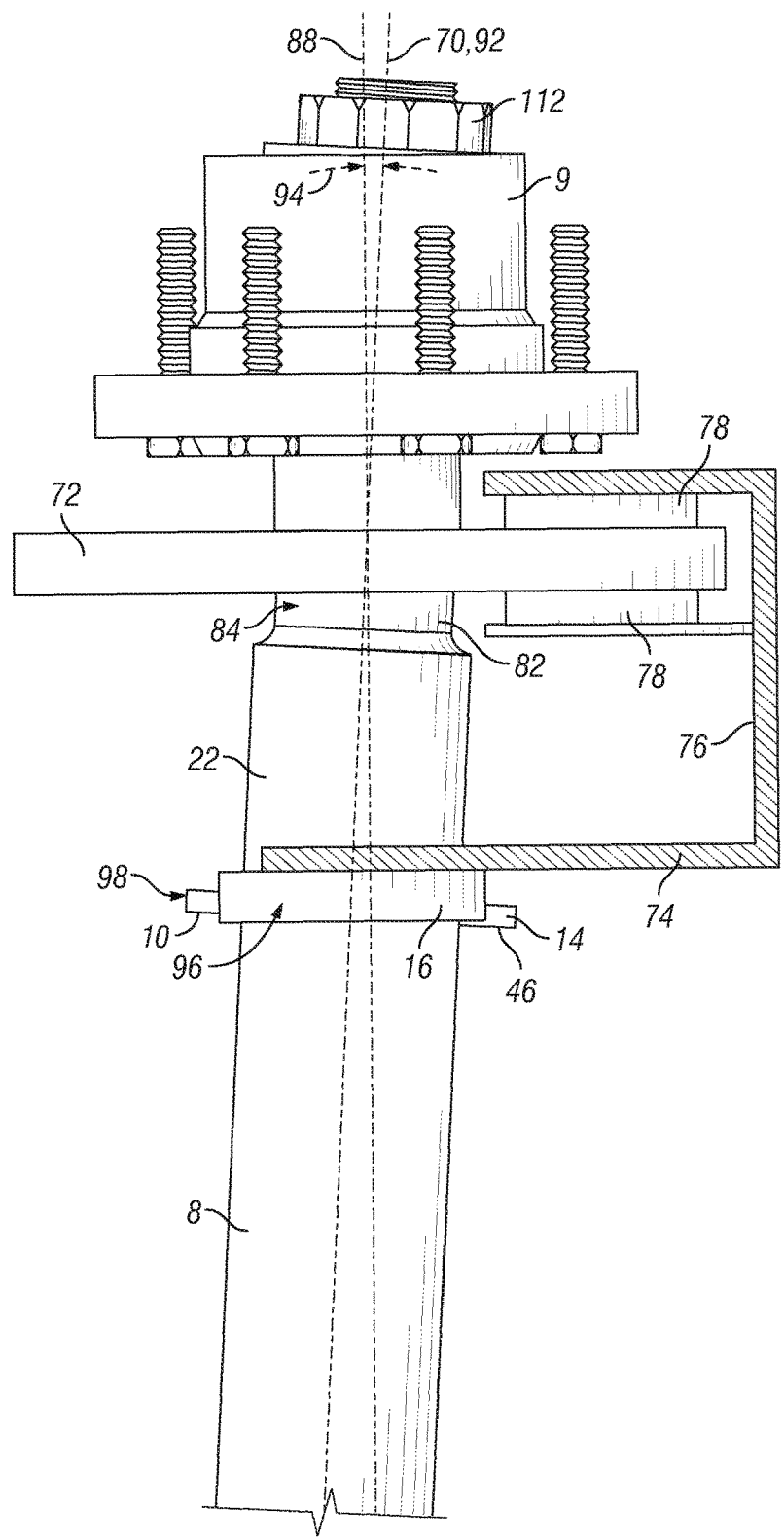
FIG. 12 is a side view of the axle assembly with a caliper brake.

The articulating brake component mounting plate 10 has been described in relation with a set of brake shoes 62 and a brake drum 66. The concept may also be applied to a caliper braking system. With reference now to FIG. 12, the hub 9, spindle sleeve 82, spindle 22 and axle tube 8 are associated with a caliper brake 76. The arrangement includes a brake rotor 72 that rotates with rotation of the hub 9. The brake rotor 72 and hub 9 both have axes that are coaxial with the spindle sleeve outer surface axis 88. The axle tube 8, spindle sleeve inner surface 90, and spindle 22 are all coaxial with the axis 70 and the spindle sleeve inner surface axis 92. The axes 70, 92 are angled with respect to the axis 88 by an angle 94. This angle 94 may be made for correction of toe or camber as needed.

A caliper bracket 74 may be rigidly mounted to the outer portion 16 of the articulating brake component mounting plate 10. The caliper brake 76 in turn may be rigidly attached to the caliper bracket 74. The caliper brake 76 includes a pair of brake pads 78 that engage the brake rotor 72 when the brakes are applied in order to slow down or stop the vehicle. Due to the angle 94, the outer portion 16 can be adjusted relative to the inner portion 14 to ensure that the brake pads 78 are properly aligned with the engagement surfaces of the brake rotor 72. Adjustment of the outer portion 16 will likewise cause a change in angular position of the caliper bracket 74, caliper brake 76, and brake pads 78 as these components are rigidly connected to one another. Allowing the brake pads 78 to pivot about the engagement pin axis 30 allows the brake pads 78 to squarely seat against the brake rotor 72 friction surfaces. The location of the adjustment nut 18 and the adjustment nut aperture 20 allows access to the adjustment fasteners so that the surface interface adjustment can be made after the vehicle is assembled. The sequence of adjustment can be made in the same manner as described above for the drum brake 66 embodiment. The articulating brake component mounting plate 10 described herein may be used on a purpose built axle which is provided with a camber adjustment feature which is outboard of the brake bracket placement.

Figure 13:
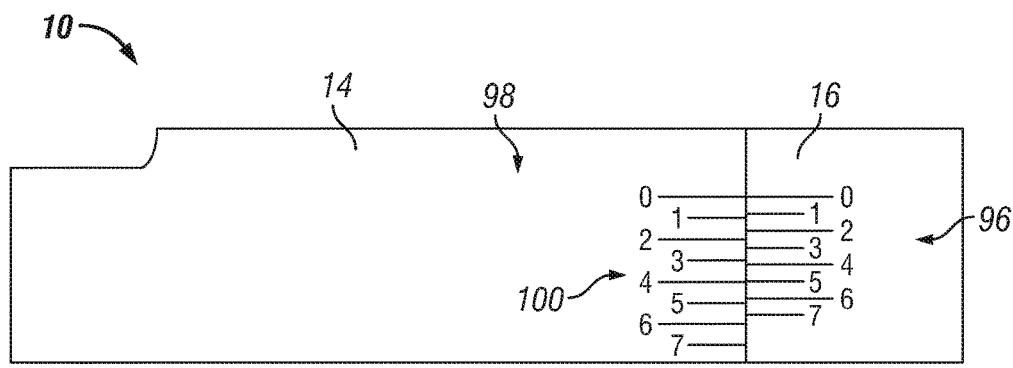
FIG. 13 is a side view of an articulating brake component mounting plate that has a vernier scale.

The articulating brake component mounting plate 10 can be provided with a vernier scale 100 to achieve a precise degree of rotational adjustment between the outer portion 16 relative to the inner portion 14. FIG. 13 shows the inner portion exterior surface 98 of the inner portion 14 having a portion of the scale of the vernier scale 100 engraved thereon. The outer portion exterior surface 96 of the outer portion 16 likewise has a portion of the vernier scale 100 engraved thereon. The vernier scale 100 is disclosed as being on the side of the articulating brake component mounting plate 10, but it is to be understood that the vernier scale 100 could be located at the top exterior surfaces or the bottom exterior surfaces of the inner portion 14 and outer portion 16 in other exemplary embodiments. The inner portion 14 is aligned with the outer portion 16 in FIG. 13 so that there is no angular misalignment. The zeros of the vernier scale 100 on both the inner portion 14 and outer portion 16 are aligned in FIG. 13.

Figure 14:
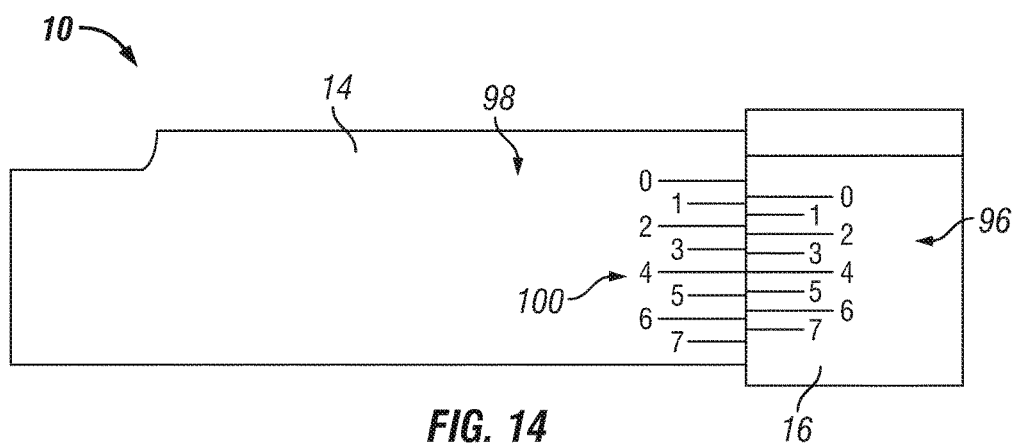
FIG. 14 is a side view of the articulating brake component mounting plate of FIG. 12 with the outer portion adjusted at an angle to the inner portion.

The outer portion 16 may be rotated relative to the inner portion 14 as previously discussed in order to properly align the brake components. FIG. 14 shows rotation of the outer portion 16 relative to the inner portion 14. The fours on the vernier scale 100 on both the outer portion 16 and the inner portion 14 are aligned in FIG. 14 and this alignment can be used to determine the degree of rotation of the outer portion 16 relative to the inner portion 14. The actual rotation of the outer portion 16 relative to the inner portion 14 may be a fraction of a degree, and this amount may be measured by the vernier scale 100.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An apparatus for a vehicle, comprising:
an axle;
an articulating brake component mounting plate carried by the axle, wherein the articulating brake component mounting plate has an inner portion and an outer portion, wherein the position of the outer portion is adjustable with respect to the inner portion, wherein either the inner portion or the outer portion defines an adjustment nut aperture, wherein the articulating brake component mounting plate has an adjustment nut located in the adjustment nut aperture; and
a spindle, wherein the inner portion has a spindle aperture that receives the spindle, wherein the spindle aperture has a spindle aperture axis, wherein the articulating brake component mounting plate has an engagement pin that has an engagement pin axis, wherein the adjustment nut engages the engagement pin, wherein the spindle aperture axis is perpendicular to the engagement pin axis, and wherein the outer portion rotates relative to the inner portion about the engagement pin axis to expose a bottom surface of the inner portion and the adjustment nut is tightened to fix the positioning of the outer portion to the inner surface such that the bottom surface of the inner portion is exposed, wherein the bottom surface is an exterior surface of the inner portion.

2. The apparatus as set forth in claim 1, wherein the adjustment nut is tightened in order to lock the position of the outer portion relative to the inner portion, and wherein the adjustment nut is loosened in order to allow adjustment of the position of the outer portion relative to the inner portion, wherein the adjustment nut aperture is located at the inner portion and is not located at the outer portion.

3. The apparatus as set forth in claim 1, wherein the outer portion has an outer portion protrusion that has a first curved surface and a second curved surface that are both convex in shape, wherein the inner portion has a receiving recess that has a first curved surface and a second curved surface that are both concave in shape, wherein the outer portion protrusion is disposed within the receiving recess, wherein the first curved surface of the outer portion protrusion engages the first curved surface of the inner portion, and wherein the second curved surface of the outer protrusion engages the second curved surface of the inner portion.

4. The apparatus as set forth in claim 3, wherein the inner portion has an engagement pin aperture that extends from the receiving recess to the adjustment nut aperture.

5. The apparatus as set forth in claim 1, further comprising a first brake pin and a second brake pin, wherein the inner portion has a cam aperture, and wherein the outer portion has a first brake pin aperture into which the first brake pin is disposed, and wherein the outer portion has a second brake pin aperture into which the second brake pin is disposed.

6. The apparatus as set forth in claim 1, further comprising a limiting pin attached to either the outer portion or the inner portion, wherein the articulating brake component mounting plate has a limiting pin groove defined in the other one of the outer portion or the inner portion that is not attached to the limiting pin, wherein the limiting pin is disposed within the limiting pin groove and limits rotation of the outer portion relative to the inner portion.

7. The apparatus as set forth in claim 6, wherein the limiting pin is attached to the outer portion, and wherein the limiting pin groove is defined in the inner portion, wherein the limiting pin groove extends about an arc length.

8. The apparatus as set forth in claim 7, wherein the outer portion has the engagement pin that has the engagement pin axis, wherein the limiting pin has a limiting pin axis, wherein the engagement pin axis is parallel to the limiting pin axis.

9. The apparatus as set forth in claim 1, further comprising:
brake shoes that have a brake shoe frictional pad;
a brake drum that has a brake drum inner surface;
wherein the outer portion carries the brake shoes and wherein the axle has an axis, wherein the inner portion has a spindle aperture axis that is coaxial with the axis of the axle, wherein the outer portion is oriented with respect to the inner portion such that the brake shoe frictional pad directly faces the brake drum inner surface.

10. The apparatus as set forth in claim 1, further comprising:
a brake rotor that is coaxial with an axis of the axle;
a caliper bracket that is carried by the outer portion;
a caliper brake that is carried by the caliper bracket, wherein the caliper brake has a pair of caliper brake pads, wherein the outer portion is oriented with respect to the inner portion such that the caliper brake pads directly face opposite sides of the brake rotor.

11. The apparatus as set forth in claim 1, wherein the adjustment nut aperture extends completely through the inner portion and is completely spaced from the bottom surface such that no portion of the adjustment nut aperture is defined by the bottom surface.

12. The apparatus as set forth in claim 1, further comprising:
a spindle sleeve disposed onto the spindle, wherein the spindle sleeve has a spindle sleeve outer surface with an outer surface of revolution about a spindle sleeve outer surface axis, wherein the spindle sleeve has a spindle sleeve inner surface with an inner surface of revolution about a spindle sleeve inner surface axis, wherein the spindle sleeve outer surface axis and the spindle sleeve inner surface axis are oriented at an angle to one another that is greater than 0 degrees.

13. The apparatus as set forth in claim 1, wherein the outer portion has an outer portion exterior surface, and wherein the inner portion has an inner portion exterior surface, wherein a vernier scale is located on both the outer portion exterior surface and the inner portion exterior surface and is used to calculate an angular orientation between the inner portion and the outer portion.

14. An apparatus for a vehicle, comprising:
an axle;
an articulating brake component mounting plate carried by the axle, wherein the articulating brake component mounting plate has an inner portion and an outer portion, wherein the position of the outer portion is adjustable with respect to the inner portion, wherein the inner portion defines an adjustment nut aperture and the adjustment nut aperture is not located at the outer portion, wherein the articulating brake component mounting plate has an adjustment nut located in the adjustment nut aperture,
wherein the adjustment nut is tightened in order to lock the position of the outer portion relative to the inner portion, and wherein the adjustment nut is loosened in order to allow adjustment of the position of the outer portion relative to the inner portion;
a spindle, wherein the inner portion has a spindle aperture that receives the spindle, wherein the spindle aperture has a spindle aperture axis, wherein the articulating brake component mounting plate has an engagement pin that has an engagement pin axis, wherein the adjustment nut engages the engagement pin, wherein the spindle aperture axis is perpendicular to the engagement pin axis, and wherein the outer portion rotates relative to the inner portion about the engagement pin axis to expose a bottom surface of the inner portion and the adjustment nut is tightened to fix the positioning of the outer portion to the inner surface such that the bottom surface of the inner portion is exposed, wherein the bottom surface is an exterior surface of the bottom portion;
brake shoes that have a brake shoe frictional pad;
a brake drum that has a brake drum inner surface;
wherein the outer portion carries the brake shoes and wherein the axle has an axis, wherein the spindle aperture axis is coaxial with the axis of the axle, wherein the outer portion is oriented with respect to the inner portion such that the brake shoe frictional pad directly faces the brake drum inner surface.

15. The apparatus as set forth in claim 14, further comprising:
a spindle sleeve disposed onto the spindle, wherein the spindle sleeve has a spindle sleeve outer surface with an outer surface of revolution about a spindle sleeve outer surface axis, wherein the spindle sleeve has a spindle sleeve inner surface with an inner surface of revolution about a spindle sleeve inner surface axis, wherein the spindle sleeve outer surface axis and the spindle sleeve inner surface axis are oriented at an angle to one another that is greater than 0 degrees.

16. An apparatus for a vehicle, comprising:
an axle;
an articulating brake component mounting plate carried by the axle, wherein the articulating brake component mounting plate has an inner portion and an outer portion, wherein the position of the outer portion is adjustable with respect to the inner portion;
brake shoes that have a brake shoe frictional pad;
a brake drum that has a brake drum inner surface, wherein the outer portion is oriented with respect to the inner portion such that the brake shoe frictional pad directly faces the brake drum inner surface; and
a spindle, wherein the inner portion has a spindle aperture that receives the spindle, wherein the spindle aperture has a spindle aperture axis, wherein the articulating brake component mounting plate has an engagement pin that has an engagement pin axis, wherein an adjustment nut engages the engagement pin, wherein the spindle aperture axis is perpendicular to the engagement pin axis, and wherein the outer portion rotates relative to the inner portion about the engagement pin axis to expose a bottom surface of the inner portion and the adjustment nut is tightened to fix the positioning of the outer portion to the inner surface such that the bottom surface of the inner portion is exposed, wherein the bottom surface is an exterior surface of the inner portion.

17. The apparatus as set forth in claim 16, wherein either the inner portion or the outer portion defines an adjustment nut aperture, wherein the adjustment nut is located in the adjustment nut aperture.

18. The apparatus as set forth in claim 17, further comprising:
 a spindle sleeve disposed onto the spindle, wherein the spindle sleeve has a spindle sleeve outer surface with an outer surface of revolution about a spindle sleeve outer surface axis, wherein the spindle sleeve has a spindle sleeve inner surface with an inner surface of revolution about a spindle sleeve inner surface axis, wherein the spindle sleeve outer surface axis and the spindle sleeve inner surface axis are oriented at an angle to one another that is greater than 0 degrees.

\* \* \* \* \*